US012327469B2

(12) United States Patent
McRae

(10) Patent No.: US 12,327,469 B2
(45) Date of Patent: Jun. 10, 2025

(54) MONITORING SYSTEM AND METHOD CAPABLE OF EVALUATING EVENTS AND SENDING DIFFERENT TYPES OF NOTIFICATIONS TO A USER DEVICE BASED ON THE EVALUATION

(71) Applicant: Arlo Technologies, Inc., Carlsbad, CA (US)

(72) Inventor: Matthew McRae, Laguna Niguel, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 170 days.

(21) Appl. No.: 17/952,922

(22) Filed: Sep. 26, 2022

(65) Prior Publication Data

US 2023/0108654 A1 Apr. 6, 2023

Related U.S. Application Data

(60) Provisional application No. 63/248,790, filed on Sep. 27, 2021.

(51) Int. Cl.
*G08B 29/02* (2006.01)
*G06V 20/52* (2022.01)
*H04W 4/021* (2018.01)

(52) U.S. Cl.
CPC ............. *G08B 29/02* (2013.01); *G06V 20/52* (2022.01)

(58) Field of Classification Search
None
See application file for complete search history.

(56) References Cited

U.S. PATENT DOCUMENTS

| | | |
|---|---|---|
| 2018/0012460 A1 | 1/2018 | Heitz, III et al. |
| 2019/0139565 A1 | 5/2019 | Chang et al. |
| 2020/0074821 A1* | 3/2020 | Horgan .................. G08B 29/22 |
| 2020/0388139 A1 | 12/2020 | Saha et al. |
| 2021/0084710 A1* | 3/2021 | Sutherland ............ H04W 4/021 |

* cited by examiner

*Primary Examiner* — John F Mortell
(74) *Attorney, Agent, or Firm* — Boyle Fredrickson, S.C.

(57) ABSTRACT

An electronic monitoring system implements an evaluation strategy to distinguish between low-interest detected events and high-interest detected events and to send lower or standard alerts to a user device if a detected event is a low-interest event and a heightened alert or warning if the detected event is a high-interest event. The system may utilize patterns of information to establish baseline event characteristics for the particular monitored environment. The baseline event characteristics are used to evaluate triggering events for determining whether those events are best categorized as low-interest or high-interest.

18 Claims, 6 Drawing Sheets

MONITORING SYSTEM AND METHOD CAPABLE OF EVALUATING EVENTS AND SENDING DIFFERENT TYPES OF NOTIFICATIONS TO A USER DEVICE BASED ON THE EVALUATION

CROSS-REFERENCE TO A RELATED APPLICATION

This application claims the benefit of provisional patent application U.S. App. No. 63/248,790, filed on Sep. 27, 2021 and entitled "Monitoring System and Method Capable of Evaluating Events and Sending Different Types of Notifications to a User Device Based on the Evaluation", the entire contents of which are hereby expressly incorporated by reference into the present application.

BACKGROUND OF THE INVENTION

1. Field of the Invention

The present invention relates to an electronic monitoring system and method and, more particularly, to an electronic monitoring system and method that generate categorized alerts or notifications. Still more particularly, the invention relates to such a system and method that can differentiate between events an provide different types of alerts as a function of the events' seriousness categorizations so that higher interest events lead to heightened alerts.

2. Discussion of the Related Art

Wi-Fi™ enabled monitoring devices in the form of video cameras are in wide use and are often used for security and other monitoring systems. Content captured by wireless enabled cameras can be communicated over the Internet. The content can be viewed in substantially real time and/or recorded for later viewing.

Some video cameras are Wi-Fi™ enabled. An example of such a camera is disclosed in U.S. Pat. No. 9,713,084, assigned to Arlo Technologies, Inc., the content of which is incorporated herein by reference. The wireless camera can be connected to a Wi-Fi™ enabled base station (BS) or access point (AP).

In addition to simply transmitting or recording images, video, and sound, such cameras may include additional features. For instance, cameras, and/or monitoring systems incorporating them, have become more sophisticated, such as being equipped with computer vision (CV) software with facial recognition, person detection, animal detection, package detection, vehicle detection, etc.

While some previous cameras and/or associated monitoring systems were equipped to perform an increasing number of recognition and/or detection tasks, these more sophisticated cameras are typically implemented along with less sophisticated detectors or sensors such as components that detect motion, vibration, sound, or smoke. Although the number of different types of cameras and sensors, and their levels of sophistication, have increased over time, the number of types of alerts has not correspondingly increased. Accordingly, systems tend to have a single or few user-notification options, with low-interest or low-interest events triggering the same alert response, such as a push notification and/or chime, as high-interest or high-risk events. This can lead to user desensitization of the alerts, since users may eventually ignore alerts that occur frequently while rarely presenting events that require attention or addressing.

Furthermore, a detected activity or event may be common when occurring during a certain time of day, but abnormal when occurring during a different time of day. One example is that a person approaching a residential front door during the afternoon may be a relatively common, low-interest, event, especially when that door is a package or postal delivery location for the residence. However, a person approaching the same residential front door during the late-night or early morning hours may be an abnormal activity or event, potentially presenting a high-interest in the form of a risk posed by a likely intruder.

In addition, although time of day based patterns may have general applicability, a specific location may have unique patterns of activity, whereby the presence of people or vehicles during times that would be unusual for most locations could be normal for that particular location.

Thus, it would be desirable to provide an improved system and process that can differentiate between types of events and send unique alerts based on predesignated criteria, such as the transmission of a heightened alert in the event of an elevated risk as a function of patterns of concern and/or information for a particular location.

SUMMARY OF THE INVENTION

In accordance with a first aspect of the invention, at least some of the above-discussed challenges are addressed by an electronic monitoring system that evaluates detected events and that provides different types of alerts depending on the evaluation. For example, the system and process may evaluate the level of interest posed by the particular events and select an alert on the basis of that evaluation. The system thus may be configured to provide unique or heightened alerts or warnings for notifying users of high-interest events that are more likely to be true causes for concern or alarm.

In accordance with another aspect of the invention, the evaluation may be determined, at least in part, based on the patterns of concern or information. The patterns of information may be predefined and/or learned over time to create a baseline of activities or events corresponding to an expected or "normal" baseline event characteristic(s). The system may evaluate detected events against the baseline event characteristics when determining whether the detected events fall outside of the normal patterns of activities or events. If the events are determined to be abnormal, then the system categorizes them as high risk, emergency, or other high-interest events, and may send heightened alerts or warnings to the user.

In accordance with another aspect of the invention, a specific pattern of information may be or include time of day information that is considered by the system while making alert decisions, such as whether to issue a heightened alert instead of a lower alert.

In accordance with another aspect of the invention, the system can also track event-related information over time to detect normal patterns, which allow the system to identify events that are abnormal. These abnormal or unique events can then be communicated to the user as an escalated alert.

In accordance with another aspect of the invention, an electronic monitoring system implements an evaluation strategy to distinguish between low-interest detected events and high-interest detected events. The system may utilize patterns of information to establish baseline event characteristics for the particular monitored environment. The baseline event characteristics are used to evaluate triggering events for determining whether those events are best categorized as low-interest or high-interest. Upon detecting a low-interest event, the system will send a lower alert, such as a default tone and/or corresponding visual message such as a push notification at a user device. Upon detecting a high-interest event that may correspond to a high risk or other high-interest situation, the system will send a heightened alert, such as a louder tone, a different tone, repeating tones, a flashing message as opposed to a simple push notification, or an alert that is otherwise designed to "grab" the user's attention more noticeably than the lower or default alert(s).

The system may be able to monitor for several levels of progressively-high-interest categories of events and to send progressively heightened alerts for higher interest categories. In the case of risk evaluation, the system could produce a simple chime and pop up notification if the detected event falls in a low-risk category, and can send a warning in the form of a louder chime, series of chimes, or a claxon or alarm if the event falls in a medium risk category. It may also inquire as to whether emergency services should be contacted and even contact emergency services if the event falls into a high risk category.

In accordance with another aspect of the invention, a method is providing of operating a monitoring system having at least some of the features and capabilities described above.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION

Figure 1:
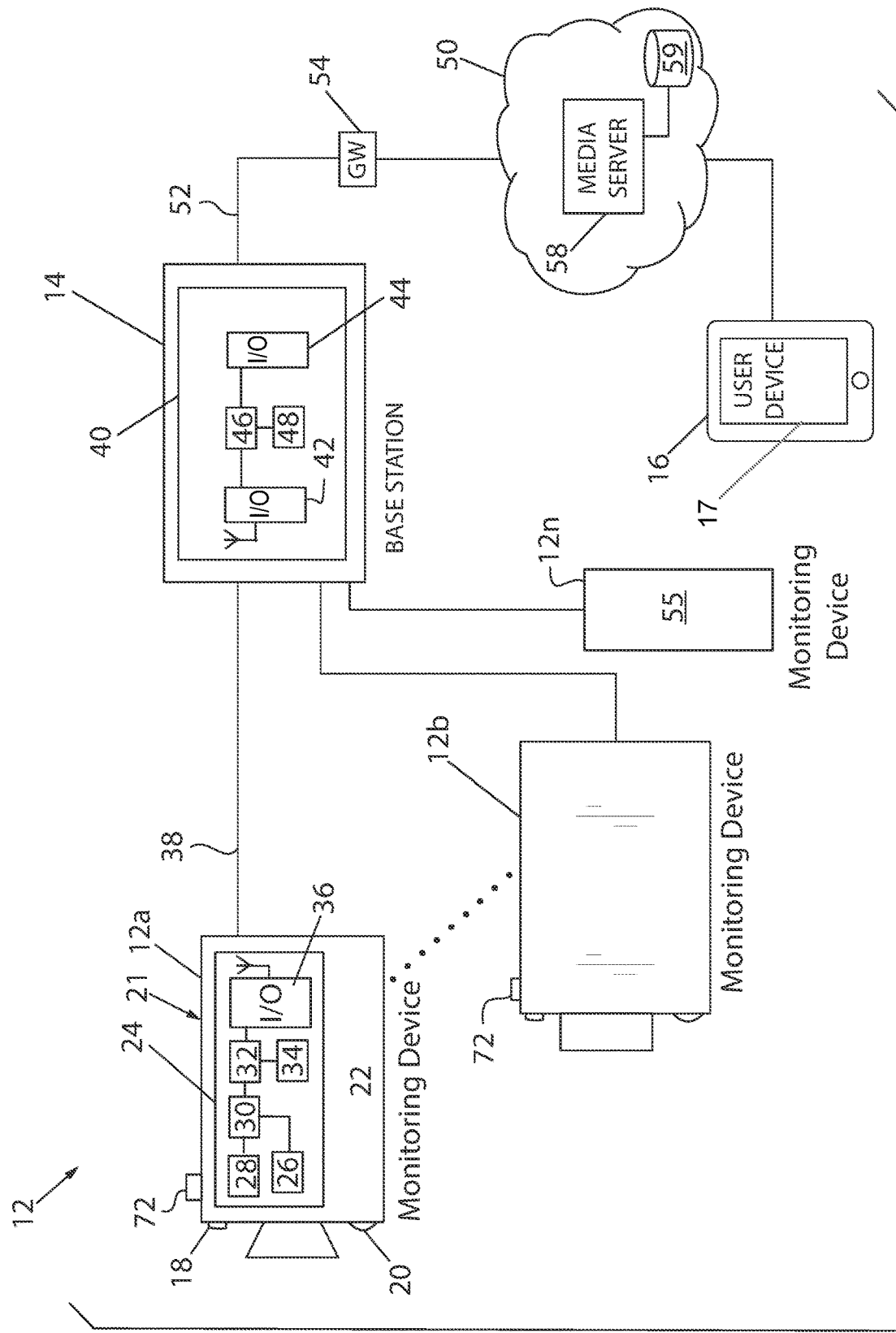
FIG. 1 is a schematic representation of a monitoring system according to aspects of the invention.

Referring now to FIG. 1, in accordance with an aspect of the invention, an electronic system 10 for real-time monitoring can include one or more monitoring devices 12 and a hub or base station 14. A number "n" 12a-12n of monitoring devices are schematically illustrated in FIG. 1. One or more user devices 16, such as a smart phone, tablet, laptop, or PC, communicate with the base station 14. Each user device 16 includes a display 17 that typically includes both an audio display and a video display, internal computing and storage capabilities, and a program or application servicing as a user interface with the remainder of the system 10. In the case of a smart phone, the display typically will include a touch screen and a speaker.

Unless otherwise specified, reference to a generic "monitoring device 12" shall apply equally to all monitoring devices 12a-12n. Each monitoring device 12 is configured to perform any of a variety of monitoring, sensing, and communicating functions, including acquiring data and to transmitting it to the base station 14 for further processing and/or transmission to a server and/or the user device(s) 16. Each monitoring device 12 may be battery powered or wired. Several such monitoring devices may be mounted around a building or other structure or area being monitored. For example, in the case of a residential home, monitoring devices 12 could be mounted by each entrance, selected windows, and even on a gate or light pole. A monitoring device 12 also could be incorporated into or coupled to a doorbell, floodlight, etc. The monitoring devices 12 may comprise any combination of devices capable of monitoring a designated area such as a home, office, industrial or commercial building, yard, parking or storage lot, etc. Each individual monitoring device may monitor one or a combination of parameters such as motion, sound, temperature etc. One or more of the individual monitoring devices 12 may be or include still or video cameras, temperature sensors, microphones, motion sensors, etc. At least one such monitoring device, shown at 12a and 12b in FIG. 1, is an imaging device described in more detail below. The data acquired by imaging device 12a, 12b typically will correspond to a video image, and each imaging device 12a may be or include a camera such as a video camera 21.

Still referring to FIG. 1, as labeled on imaging device 12a, one or more of the imaging devices may also include a microphone 18, visible and/or infrared (IR) lights 20, a power supply 22 such as a battery or battery pack, and/or imaging device electronic circuitry 24. Circuitry 24 may include one or more imagers 26, an audio circuit 28, a media encoder 30, a processor 32, a non-transient memory storage 34 and/or a wireless I/O communication device 36, among other things.

Still referring to FIG. 1, each monitoring device 12 can communicate with the base station 14 through a network 38. It is contemplated that the network 38 may be in whole or in part a wired network, a wireless network, or a combination thereof. The network 38 may include a private Wireless Local Area Network (WLAN) 38, hosted by the base station 14 operating as an access point. One such network is an IEEE 802.11 network. The hub or base station 14 can include base station electronic circuitry 40 including a first wireless I/O communication device 42 for communicating with the monitoring devices 12 over the WLAN 38, a second wired or wireless I/O communication device 44 for accessing a Wide Area Network (WAN) 50, such as the Internet through a Local Area Network (LAN) 52 connected to a Gateway and/or Router 54, a processor 46 and/or a non-transient memory storage 48, among other things. The base station 14 also could be combined with a gateway router 54 or another device or a combination devices in a single module or connected modules, which would still be considered a "base station" within the meaning of the present disclosure. It should be apparent that "circuitry" in the regard can comprise hardware, firmware, software, or any combination thereof.

Instead of or in addition to containing a video camera 21 or other imaging device, one or all of the monitoring devices 12 may include one or more sensors 55 configured to detect one or more types of conditions or stimulus, for example, motion, opening or closing events of doors or windows, sounds such as breaking glass or gunshots, the presence of smoke, carbon monoxide, water leaks, and temperature changes. The monitoring devices 12 may further include or be other devices such as audio devices, including microphones, sound sensors, and speakers configured for audio communication or providing audible alerts, such as Arlo Chime audible devices. The imaging devices or cameras 21, sensors 55, or other monitoring devices 12 also may be incorporated into form factors of other house or building accessories, such as doorbells, floodlights, etc., each which may be available on a stand-alone basis or as part of any of a number of systems available from Arlo Technologies, Inc. of Carlsbad, California.

Still referring to FIG. 1, the base station 14 may also be in communication with a server 58, which may be a cloud-server accessible via the WAN 50. The server 58 can include or be coupled to a microprocessor, a microcontroller or other programmable logic element (individually and collectively considered "a controller") configured to execute a program. Alternatively, interconnected aspects of the controller and the programs executed by it could be distributed in various permutations within the monitoring device 12, the base station 14, the user device 16, and the server 58. This program, while operating at the server level, may be utilized in filtering, processing, categorizing, storing, recalling and transmitting data received from the monitoring devices 12 via the base station 14. Server 58 may also be in communication with or include a computer vision (CV) program, also referred to as an image evaluation module, which can apply one or more filters or processes, such as edge detection, facial recognition, motion detection, etc., to detect one or more characteristics of the image or other recording such as, but not limited to, identifying or detection of a specific individual person(s) or a person(s) in general, an animal, vehicle, or package present in the image or recording. Some or all aspects of the image evaluation module also could be contained in the base station 14 or even the monitoring devices 12. The evaluation module and further capabilities will further be described below.

In operation, each monitoring device 12 can be configured, through suitable mounting of the monitoring device 12 and/or through suitable manipulation of its controls, to monitor an area of interest, such as a part of a building or section of property or a monitored zone. In the case of imaging device 12a, the device 12a may capture an image automatically upon detection of a triggering event and/or upon receipt of a command from a user device 16. An image also may be captured automatically upon detection of a triggering event detected by a detector. Whether the monitoring device is an imaging device or some other device, the triggering event may be motion, and the detector may be a motion detector. Instead of or in addition to detecting motion, the detector could include an IR sensor detecting heat, such as the body heat of an animal or person. The triggering event also could be sound, in which case the detector may include the microphone 18. In this case, the triggering event may be a sound exceeding a designated decibel level or some other identifiable threshold. Upon receiving notification from a monitoring device 12 of a triggering event, the system 10 can generate an alert such as a push notification ("PN") and send it to one or more user devices 16 for indicating the triggering event. As explained in more detail below, the particular alert sent to the user device 16 will have characteristics that correspond to the type of stimulus or event that was detected.

In the case of the monitoring device being an imaging device 12a having a camera, whether camera operation is triggered by a command from a user device 16 or by detection of a triggering event, the camera 21 can then capture a raw video stream which, in turn, can be provided to the media encoder 30 for producing video packets in an encoded video stream. Similarly, the microphone 18 and the audio circuit 28 can capture a raw audio stream which, in turn, can be provided to the media encoder 30 for producing audio packets in an encoded audio stream. Accordingly, the video and/or audio packets, referred to herein as "media" packets, are provided in an encoded media stream. Under control of the processor 32 executing the program, the encoded media stream can be transmitted from the wireless I/O communication device 36 to the base station 14.

The media stream may then be transmitted via the WAN 50 to a remote data storage device 59 in communication with a media server 58 for data storage and processing. The storage device 59 may be a cloud-based storage device, and the media server 58 may be a cloud server accessible via a wireless connection. A filtered or otherwise processed image can then be displayed on the user device 16, along with additional visual and/or audio messaging such as a text and/or audio message identifying a generic or particular person or object.

Figure 2:
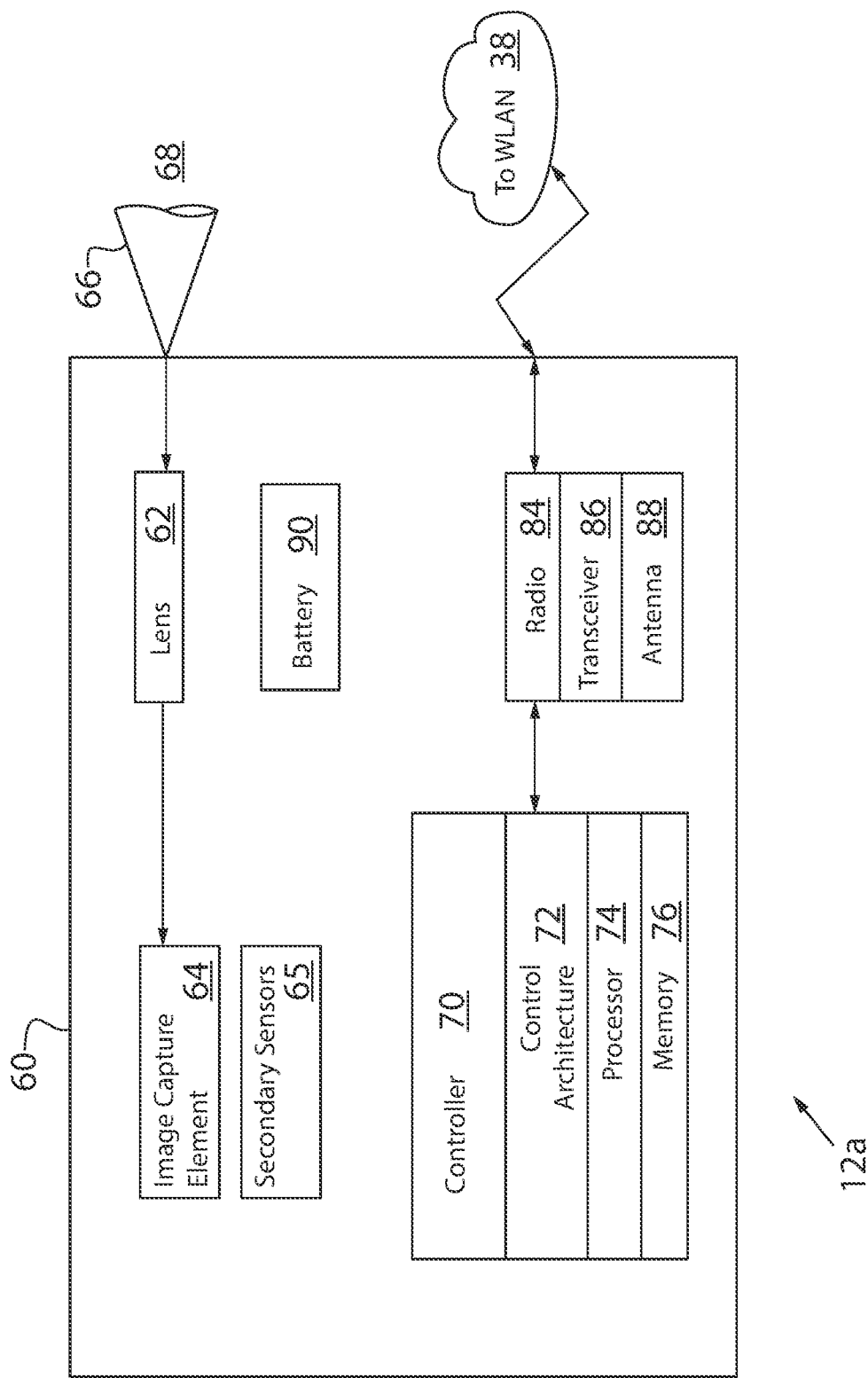
FIG. 2 is a block diagram representing an imaging device shown in FIG. 1.

FIG. 2 represents an example of imaging device 12a shown in FIG. 1. In the illustration, the imaging devices 12a has a small and compact housing 60 for enclosing and protecting the various camera components illustrated as blocks in FIG. 2. The imaging device 12a includes a lens 62 and an image capture element (or primary sensor) 64. The image capture element 64 can be any suitable type of image capturing device or sensor; including, for example, an area array sensor, a Charge Coupled Device (CCD) sensor, a Complementary Metal Oxide Semiconductor (CMOS) sensor, or a linear array sensor, just to name a few possibilities. The image capture element 64 may capture images in suitable wavelengths on the electromagnetic spectrum. The image capture element 64 may capture color images and/or grayscale images.

The imaging device 12a has a field of view 66 extending radially from the outwardly facing lens 62. The field of view 66 is a portion of the environment 68 within which the imaging device 12a can detect electromagnetic radiation via the lens 62 and image capture element 64. The imaging device 12a is configured to capture images. An image is a digital representation of a scene for the environment 68 as captured by the imaging device 12a. Capturing an image refers to the act of obtaining and recording an image data file or stream of the digital representation. The scene is the portion of the environment 68 observed through the field of view 66. Capturing a plurality of images in a timed sequence can result in a video. Capturing a video refers to the act of obtaining and recording a video data file or stream of the digital representation.

Still referring to FIG. 2, the imaging device 12a has a controller 70 including a control architecture 72 having a processor 74 and a memory 76. Of course, the controller could similarly have multiple processors, such as dual processors and accompanying memory. The processor 74 can include any component or group of components that are configured to execute, implement, and/or perform any of the processes or functions described herein or any form of instructions to carry out such processes or cause such processes to be performed. Examples of suitable processors include a microprocessor, microcontroller, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 74 can include a hardware circuit (e.g., an integrated circuit) configured to carry out instructions contained in program code.

The memory 76 stores one or more types of instructions and/or data. The memory 76 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 76 can be a component of a processor, can be operatively connected to a processor for use thereby, or a combination of both. The memory 76 can include various instructions stored thereon. For example, the memory 76 can store one or more modules. Modules can be or include computer-readable instructions that, when executed by a processor, cause a processor to perform the various functions disclosed herein. While functions may be described herein for purposes of brevity, it is noted that the functions are performed by the processor 74 using the instructions stored on or included in the various modules described herein. Some modules may be stored remotely and accessible by a processor using, for instance, various communication devices and protocols.

The imaging device 12*a* typically communicates wirelessly (e.g., with the base station 14) via an input/output device, such as a radio 84. An example of a radio includes a wireless local area network (WLAN) radio. With the WLAN radio 84, the imaging device 12*a* generally communicates over a short-range wireless communication network, such as the WLAN 38. In one implementation, the radio 84 includes a transceiver 86 for transmitting and receiving signals to and from the base station 14, via an antenna 88. The transceiver 86 can be separate from or part of the control architecture 72. The wireless communication can be as prescribed by the IEEE 802.11 standards in accordance with the Wi-Fi™ communication protocol. It is appreciated, however, that the imaging device 12*a* can be adapted to perform communications in accordance with other known or to be developed communication protocol, or even a proprietary communication protocol developed for a particular application. Also, while only a single transceiver 86 and single antenna 88 is shown, multiple transceivers and multiple antennas can be used to communicate at multiple communication frequency bands. Alternatively, the single transceiver 86 and the single radio 84 can communicate over multiple frequency bands.

The imaging devices 12*a* can further include secondary sensors 92. For example, a secondary sensor 92 may be a microphone, a motion sensor, a temperature sensor, an image sensor, and a vibration sensor.

An exemplary camera capable of incorporating aspects of the invention is an Arlo Ultra brand camera available from Arlo Technologies in Carlsbad, California, US. Before moving to other components of the system 10, it should be understood by somebody skilled in the art that the imaging devices 12*a* includes many additional conventional components typically found in a wireless camera. Further discussion regarding these components is not provided herein since the components are conventional.

Figure 3:
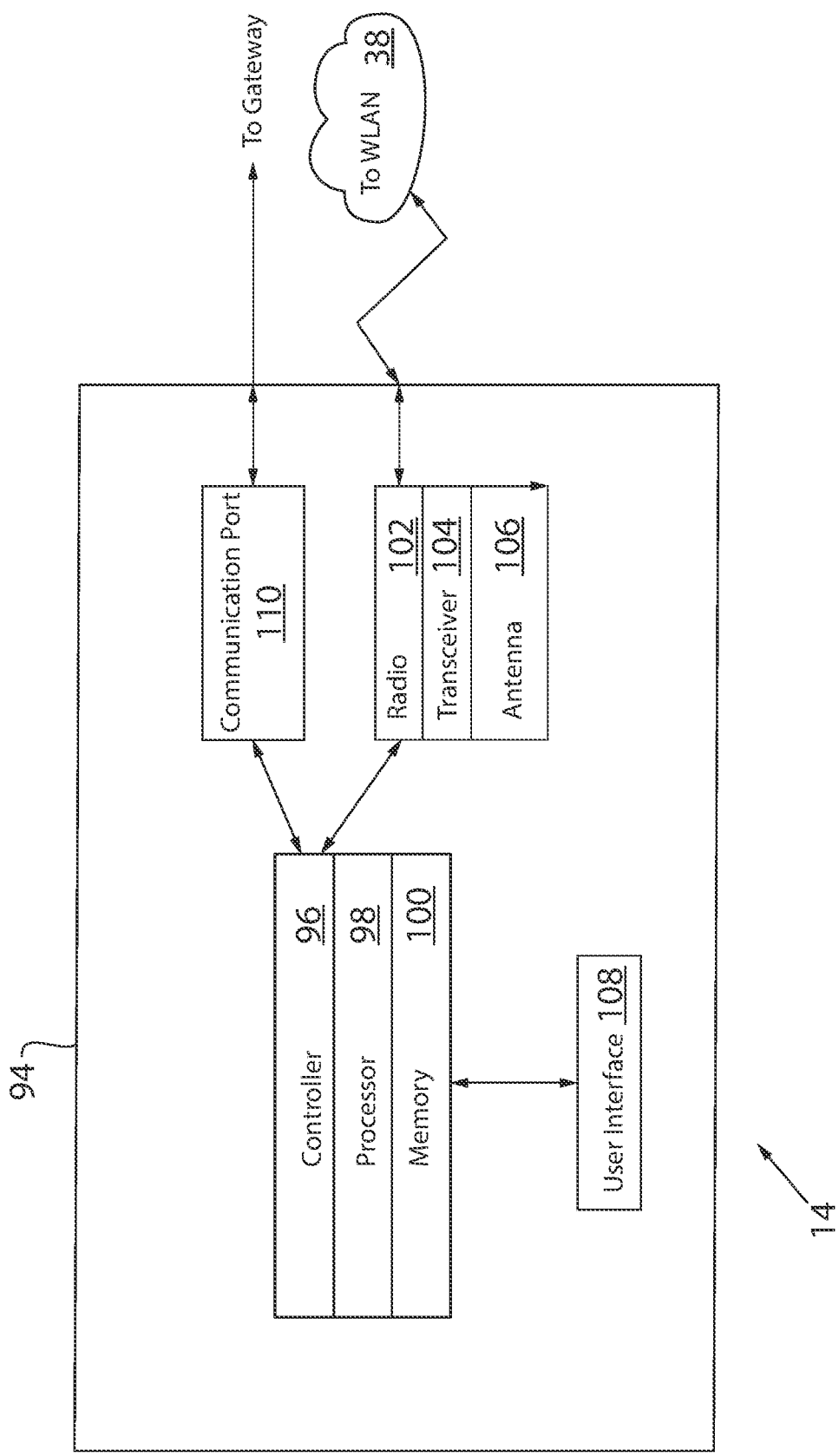
FIG. 3 is a block diagram representing a base station shown in FIG. 1.

Turning now to FIG. 3, the figure represents an example of the base station 14 shown in FIG. 1. In the illustration, the base station 14 has a housing 94 for enclosing and protecting the various components illustrated as blocks in FIG. 3. The base station 14 has a controller 96, including a processor 98 and a memory 100. While the arrangement of FIG. 3 shows a single processor 98 and a single memory 100, it is envisioned that many other arrangements are possible. For example, multiple elements of the base station 14 can include a distinct processor and memory. The processor 98 can include a component or group of components that are configured to execute, implement, and/or perform any of the processes or functions described herein for the base station 14 or a form of instructions to carry out such processes or cause such processes to be performed. Examples of suitable processors include a microprocessor, a microcontroller, and other circuitry that can execute software. Further examples of suitable processors include, but are not limited to, a core processor, a central processing unit (CPU), a graphical processing unit (GPU), an array processor, a vector processor, a digital signal processor (DSP), a field-programmable gate array (FPGA), a programmable logic array (PLA), an application specific integrated circuit (ASIC), math co-processors, and programmable logic circuitry. The processor 98 can include a hardware circuit (e.g., an integrated circuit) configured to carry out instructions contained in program code. In arrangements in which there are a plurality of processors, such processors can work independently from each other, or one or more processors can work in combination with each other.

Still referring to FIG. 3, the base station 14 includes a memory 100 for storing one or more types of instructions and/or data. The memory 100 can include volatile and/or non-volatile memory. Examples of suitable memory include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, disks, drives, or any other suitable storage medium, or any combination thereof. The memory 100 can be a component of the processor 98, can be operatively connected to the processor 98 for use thereby, or a combination of both. The controller 96 can include various instructions stored thereon. For example, the controller 96 can store one or more modules. Modules can be or include computer-readable instructions that, when executed, cause the processor 98 to perform the various functions disclosed for the module. While functions may be described herein for purposes of brevity, it is noted that the functions are performed by the processor 98 or another portion of the controller using the instructions stored on or included in the various modules. Some modules may be stored remotely and accessible by the processor 98 or another portion of the controller using, for instance, various communication devices and protocols.

Still referring to FIG. 3, the base station 14 typically communicates wirelessly (e.g., with the imaging devices 12) via a radio 102. An example of a radio includes a wireless local area network (WLAN) radio. With the WLAN radio 102, the base station 14 generally communicates over a short-range wireless communication network, such as the WLAN 38. In one implementation, the radio 102 includes a transceiver 104 for transmitting and receiving signals to and from the base station 14, via an antenna 106. The transceiver 104 can be separate to or part of the controller 96. The wireless communication can be as prescribed by the IEEE 802.11 standards in accordance with the Wi-Fi™ communication protocol. It is appreciated, however, that the base station 14 can be adapted to perform communications in accordance with other known or to be developed communication protocol, or even a proprietary communication protocol developed for a particular application. Also, while only a single transceiver 104 and single antenna 106 is shown, multiple transceivers and multiple antennas can be used to communicate at multiple communication frequency bands. Alternatively, the single transceiver 104 and the single radio 102 can communicate over multiple frequency bands.

The base station 14 includes the user interface 108. The user interface 108 can include an input apparatus and an output apparatus. The input apparatus includes a device, component, system, element, or arrangement or groups thereof that enable information/data to be entered into the base station 14 from a user. The output apparatus includes any device, component, or arrangement or groups thereof that enable information/data to be presented to the user. The input apparatus and the output apparatus can be combined as a single apparatus, such as a touch screen commonly used by many electronic devices.

The base station 14 includes a communication port 110, which is configured to provide a communication interface between a larger computer network, such as the Internet via the gateway.

In one construction, since the base station 14 is powered by an enduring power source (e.g., power outlet), it is not necessary for the base station 14 to be operated in a default sleep mode, although this is not precluded. An exemplary base station capable of incorporating aspects of the invention is an Arlo SmartHub brand base station available from Arlo Technologies in Carlsbad, California, US. Before moving to the operation of the system 10, it should be well understood by somebody skilled in the art that the base station 14 includes many additional conventional components typically found in a base station or access point.

As briefly mentioned above, the CV program, or image evaluation module, stored in or accessible by the controller on the server 58 may be equipped with additional features to enhance operating capabilities of system 10. For purposes of discussion, the CV program will be discussed with respect to execution on the server 58. However, it is understood that controller may refer to the controller on the server 58, the controller 70 on the imaging device 12a, the controller 96 on the base station 14, or a combination thereof. Each controller includes memory configured to store instructions and a processor configured to execute the stored instructions. Modules may be stored in the memory for any of the devices and executed by the corresponding processor. The imaging device 12a is in communication with the base station 14, and the base station 14 is in communication with the server 58. Thus, a portion of the processing, which will be described with respect to the CV program, may be executed on any controller and the output of the processing communicated to another processor for another portion of the processing.

Figure 4:
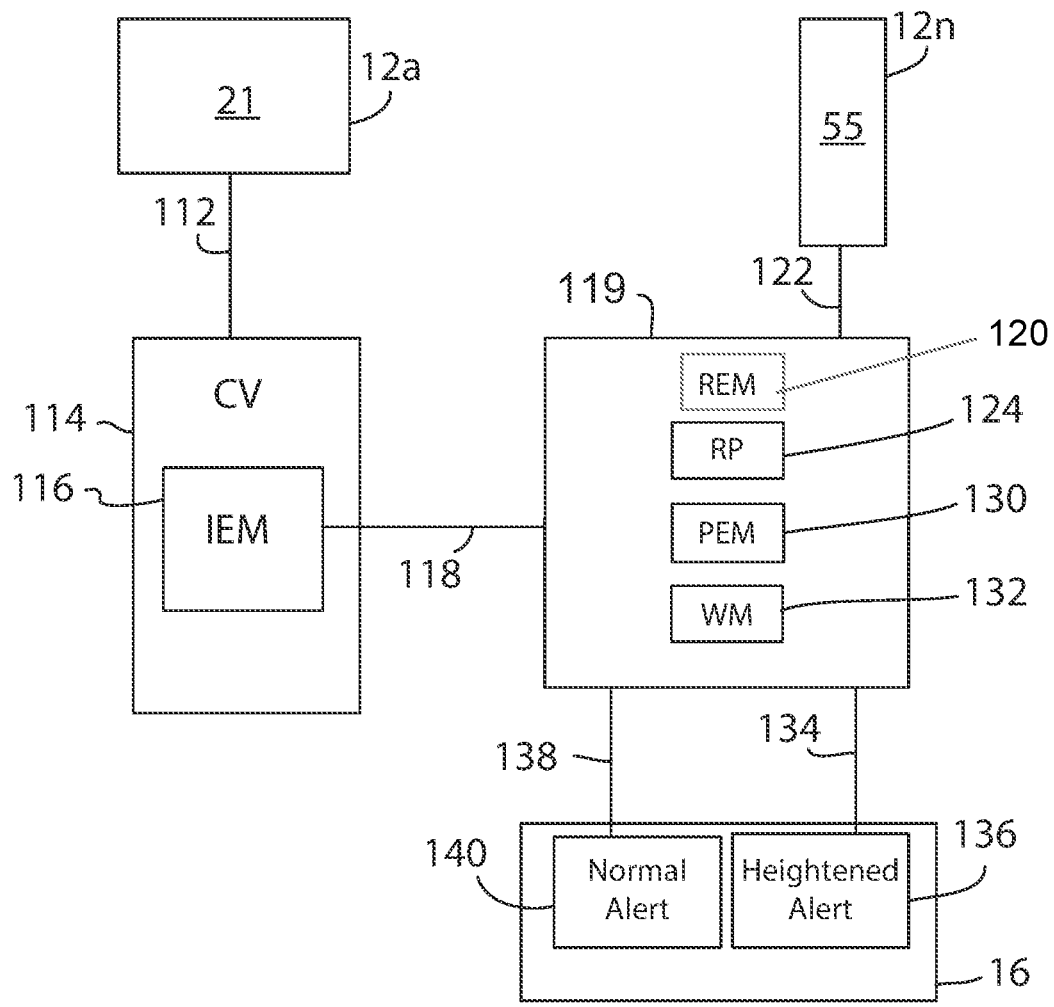
FIG. 4 is a schematic representation of various components within the system.

Referring now to FIG. 4, the imaging device 12a is represented schematically as including a camera 21 that transmits image data 112 for evaluation by the CV program 114, shown here as being or including an image evaluation module 116 (IEM). Sensor data 122 is transmitted by the sensor 55 for analysis by a categorization module 119 that evaluates the detected event and determines whether the event falls within a particular interest level category. In the present embodiment, the categorization module 119 includes a risk evaluation module (REM) 120. The risk evaluation module 120 typically determines a level of alert to be sent to the user device 16 based on a corresponding triggering event risk level, ranging from low-interest or non-emergency events to high-interest or emergency events.

Still referring to FIG. 4, risk evaluation module 120 may utilize one or more risk parameters (RPs) 124 during its further evaluation of the evaluated image data 118 and sensor data 122. The risk parameters may include various data, rules, and/or other information stored in the storage device 59 (FIG. 1) or elsewhere in the system 10 or an external server. Access to these risk parameters facilitate the risk evaluation module's categorization or determination of risk level of the triggering event. The risk parameters 124 may include definitions of some events that are, by default, high-interest, high risk, or emergency events. Such events may include events detected by certain types of sensors 55 and their respective sensor data 122, which will always correspond to high risk or emergency events as their triggering events. For example, the system could always generate a heighted alert upon the triggering of a smoke detector regardless of the specific event, such as the detection of smoke or carbon monoxide, that caused the triggering. A heighted alert also could automatically be triggered the detection of specific events by a sensor capable of detecting both low-interest and high-interest events, such as the detection of a breaking glass, screams, or a gunshot sound by a microphone.

Similarly, some types of images recorded by cameras 21 and their respective evaluated image data 118 will always correspond to default high risk or emergency events. These image types may include image or sound recordings through the camera 21 and/or its included microphone that relate to the default high-interest events mentioned above with respect to sensors 55. These events may be reflected by images or sounds recorded by camera 21 that correspond to visually or audibly detected presence of fire, smoke, breaking glass, screams, or gunshots. Other images or sounds detected by camera 21 can correspond to default emergency events. These include images that the CV program's image evaluation module 116 determines are 1) the detection of a person or vehicle at an abnormal time of day (which may be based on past system activity), 2) the detection of a large group of people, 3) the detection of several different people by m multiple cameras 21 simultaneously, 4) the detection of a gun or other weapon, or 5) the detection of an individual in a hazardous situation, such as the detection of a child being located near or falling into a pool. The event also could be a user-defined event, such as the detection of a particular individual having been pre-identified by the user as someone who is not welcome on the premises. That individual's image could be uploaded by the user using device 16, or even accessed from a third party such as a law enforcement agency, and stored in a database in the system 10 or accessible by the system.

Still referring to FIG. 4, at least some of the risk parameters 124 may be or include patterns of information that related to different potential triggering events. The patterns of information may be predefined, which may include being defined or redefined by a user, or automatically defined or redefined by the system 10 as a learned pattern(s) of information. Regardless of how the patterns are obtained, the risk evaluation module 120 may evaluate the triggering event by way of the evaluated image data 118 or sensor data 122 as a function of patterns of information, which allows the system 10 to differentiate between low-interest or normal events and events that would be considered high-interest.

Still referring to FIG. 4, the patterns of information may be specific to the particular monitored location and may be predetermined or user defined. For example, the detection of an individual during the day may be considered a low interest event if it occurs by the front door of a residence, but a high interest event if it occurs in a back yard or a garage. System 10 also may be implemented in different operational modes to temporarily apply different assessments of patterns of information or assessment rules as evaluation criteria. An example is a vacation mode in which the user's residence will be unoccupied and the risk evaluation module 120 uses different rules in its determination of interest categories of different events. In a vacation mode example, the risk evaluation module 120 may be configured to determine that a detected temperature below a target temperature or the presence of any person in the monitored zone during the nighttime (such as between the times of 11 pm and 6 am) defines a high-interest event, even though these conditions may be normal during the system's default or normal operational mode.

Still referring to FIG. 4, regardless of a particular mode that may be used for system learning, the learning is typically performed by way of a pattern evaluation module (PEM) 130 that assesses information corresponding to previously observed events. This assessment may include storing images and/or corresponding time, date, subject, or other characteristic information to create a learning set of data that is stored in a log or database that may be stored in the storage device 59 (FIG. 1). The learning set of data may be created by saving the images and/or their corresponding information for predefined time periods, for example, at least three weeks, and/or for a user-defined time period, and/or on an ongoing continuous basis. The pattern evaluation module 130 will periodically analyze the data to identify common characteristics in the learning set and correspondingly develop pattern definitions. If the system is configured for automatic implementation of learned patterns, then the pattern evaluation module 130 will store information about the pattern, for example, as a risk parameter 124 and/or other data used by the risk evaluation module 120. If the system 10 is configured for user confirmation before implementing new or revised pattern characteristics, then the system will send a request through the user device 16 to authorize such additional stored pattern or update an existing stored pattern.

Still referring to FIG. 4, in addition to using patterns of information to define reduced-risk or other low-interest conditions to detected events, the system 10 may utilize the patterns of information to identify absences of normal events corresponding to high-interest or potential emergency situations. An example includes the pattern evaluation module 130 establishing a baseline event characteristic or baseline detected activity of a child returning from school by detecting a particular person approaching a monitored door between the times of 2:00 pm and 3:00 pm on the days of Monday through Friday. A watch module 132 that may be incorporated into the risk evaluation module 120 assesses whether expected events have occurred and, if not, reports the absence of the event to the risk evaluation module 120 for assessment of categorization of interest. In the child returning from school example, if the watch module 132 determines that the particular person did not approach the monitored door between the 2:00 pm and 3:00 pm on a Tuesday, then the watch module 132 reports the absence to the risk evaluation module 120, which may determine that the absence is a high-interest event or situation. The system 10 then may send a corresponding heightened alert to the user, such as a notification of "[NAME] NOT HOME FROM SCHOOL" and a corresponding loud tone through the user device 16. Other examples of event absences based on underlying baseline patterns of activity that can be reported by the watch module 132 to the risk evaluation module 120 may include extended time periods in which a grandparent or other monitored person was not seen moving within their residence.

Still referring to FIG. 4, regardless of the particular event(s) or absence of event(s) that is determined to constitute a high-interest event, such escalated events can trigger alerts that are heightened in a variety of ways through, for example, alerts or notifications that are visually and/or audibly distinguishable from lower event alerts or notifications. Upon system detection of a high-interest event, the heightened alert 136 or notification may include, for example, any or all of an iOS, Android, or system level emergency notification, commanding a more intense vibration of the user device 16, sending repeated alerts, sending an automatic notification to emergency responders or dispatch, automatically activating a siren, sending a text message to the user or other party, triggering a phone call or the user or other party.

Still referring to FIG. 4, if the risk evaluation module 120 determines that the event is normal or of low-interest, then system 10, shown here by way of risk evaluation module 120, sends a command 138 that provide for the transmission of a normal or standard alert 140, which is typically displayed at through the user device 16. The normal alert 140 is typically the default notification sent by the system 10 to the user device, such as a text or other message, tone, or pop-up image.

It should be noted that the categorization module 119 could be used to assess parameters other than risks. For example, the module 119 could be configured to determine whether a package is being delivered at the front door, which would be of higher interest to the user than someone walking by the front door. The system 10 then could trigger the transmission of a heightened alert to the user device 16. In all such instances, the system determines whether a detected event is a low-interest event or a high-interest event.

The system 10 need not be limited to the generation of only two (high or low) categories of alerts. It instead could evaluate for three or more categories of progressively high-interest events and transmit progressively-heightened alerts corresponding to the heighted interest categories.

Figure 5:
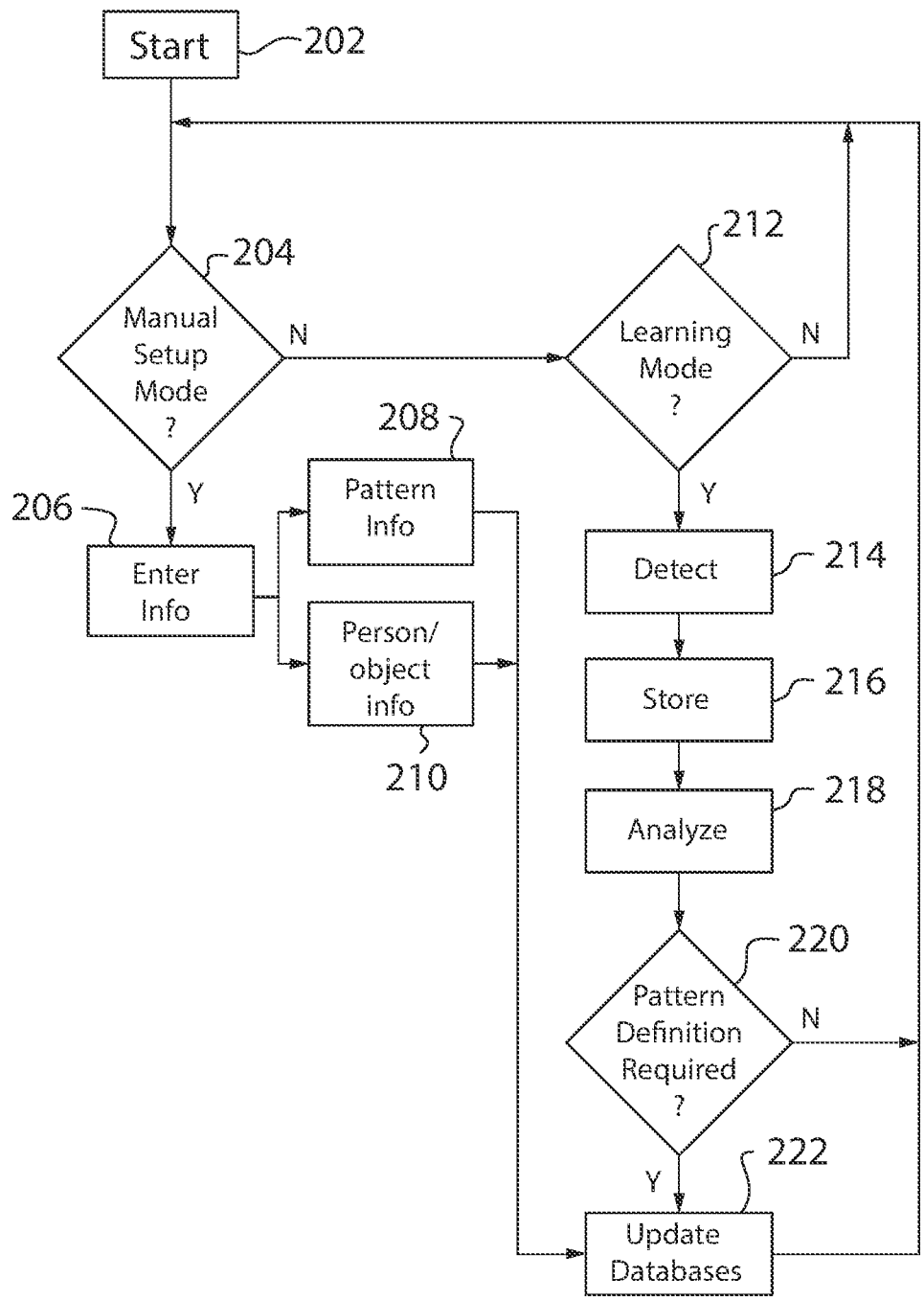
FIG. 5 is a flowchart illustrating setup modes for defining patterns that can be used for evaluating detected events and for selective alert levels.

In addition to evaluating for default high-interest events, the system may also be configured for a setup operation relying on a learning procedure or a user or third party input to define criterion for categorizing detected events as low-interest or high-interest. Referring now to FIG. 5, and with background reference to FIGS. 1-4, the flowchart represents a process 200 of implementing various setup and/or learning modes to facilitate the obtainment of interest definitions. Process 200 is implemented by system 10 in cooperation with the user device 16 and the server 58. Process 200 proceeds from START at block 202 to decision block 204, where it determines whether a manual set-up mode has been commanded by the user. If so, the user may enter values or other inputs through the user device 16, as represented at block 206. The entered information may define expected patterns of activity that could be detected during system use, as represented at block 208. For example, using a drop down menu on the display 17 of the user device, the process may cause the user device to display a query asking the user to enter or define typical commute-related information, such as a typical range of time for leaving for work, a typical range of time for returning from work, typical workdays, as well as typical monitored zones in which the user may be detected during such commute-related activity. In one example of commute-related activity information entry in a manual setup mode, the user may input a typical home departure time range from a monitored area such as a driveway or garage of between 6:30 am and 7:00 am and a typical home arrival time range between 5:00 pm and 6:00 pm. This time range also may be limited to specific days, such as weekdays.

Instead of or in addition to storing pattern-based evaluation parameters, one or more specific individuals may be identified as high risk or high high-interest as represented in block 210. This identification may include the uploading of image(s) of the individual(s) by the user. Such a high-interest person may be either a welcome person, such as a spouse or a child, or an unwelcome person, such as hostile ex-spouse or neighbor. It is also contemplated that a third party may define an object or person of high-interest or other high-interest event. In one example, a law enforcement agency may send image data about a person, such as a wanted criminal, a missing child, or a missing elderly person, whose whereabouts is being sought in the area.

Whether an event is stored in terms of a pattern (block 208) or a specific individual's image (210), or some other categorized event entirely, the manually-entered event and its corresponding interest category are stored in a database in block 222.

Still referring to FIG. 5, instead of or in addition to being implemented in a manual setup mode, the process 200 may be implemented in a learning mode as represented at decision block 212. In this learning mode, the process automatically identifies patterns of events or combinations of events and uses those patterns or combinations in its interest evaluation(s). For example, a scheduled time period may be selected by the user using device 16, for example, for a two-week learning session, during which time various pattern learning tasks will be executed. In another example, the learning mode may be a continuous learning mode that updates its identified pattern definitions and treatment rules for evaluating detected events. During use of the learning mode(s), the process 200 may implement user-confirmation requirements before committing identified pattern definitions or treatment rules into implementation through the categorization module's 119 evaluation strategy. In another commuter activity example in which the user is a is a second shift worker, during a learning session, the process may recognize a pattern during weekdays of a vehicle entering the driveway between 11:30 pm and 12:30 am. As a user confirmation request, the system 10 may send a notification through the user device 16 to accept or reject vehicle detection during that time period as normal activity or normal concern. This may be accomplished by displaying as a message of: "VEHICLE DETECTED M-F IN DRIVEWAY ZONE BETWEEN 11:30 PM-12:30 AM ACCEPT AS NORMAL ACTIVITY? Y/N". If the user presses "Y" to confirm this pattern of activity as normal, the system commits the pattern as a baselevel activity of normal interest against which future event evaluations may be performed. During this learning mode, triggering events are detected, stored, and analyzed for common characteristics that may define a pattern(s). See blocks 214, 216, and 218. At decision block 220, if the recognized pattern(s) differs from those stored, then the process 200 will add a new pattern definition or update a previous underlying pattern definition and its corresponding alert response level to the database at block 222. If not, the process 200 returns to block 204.

Figure 6:
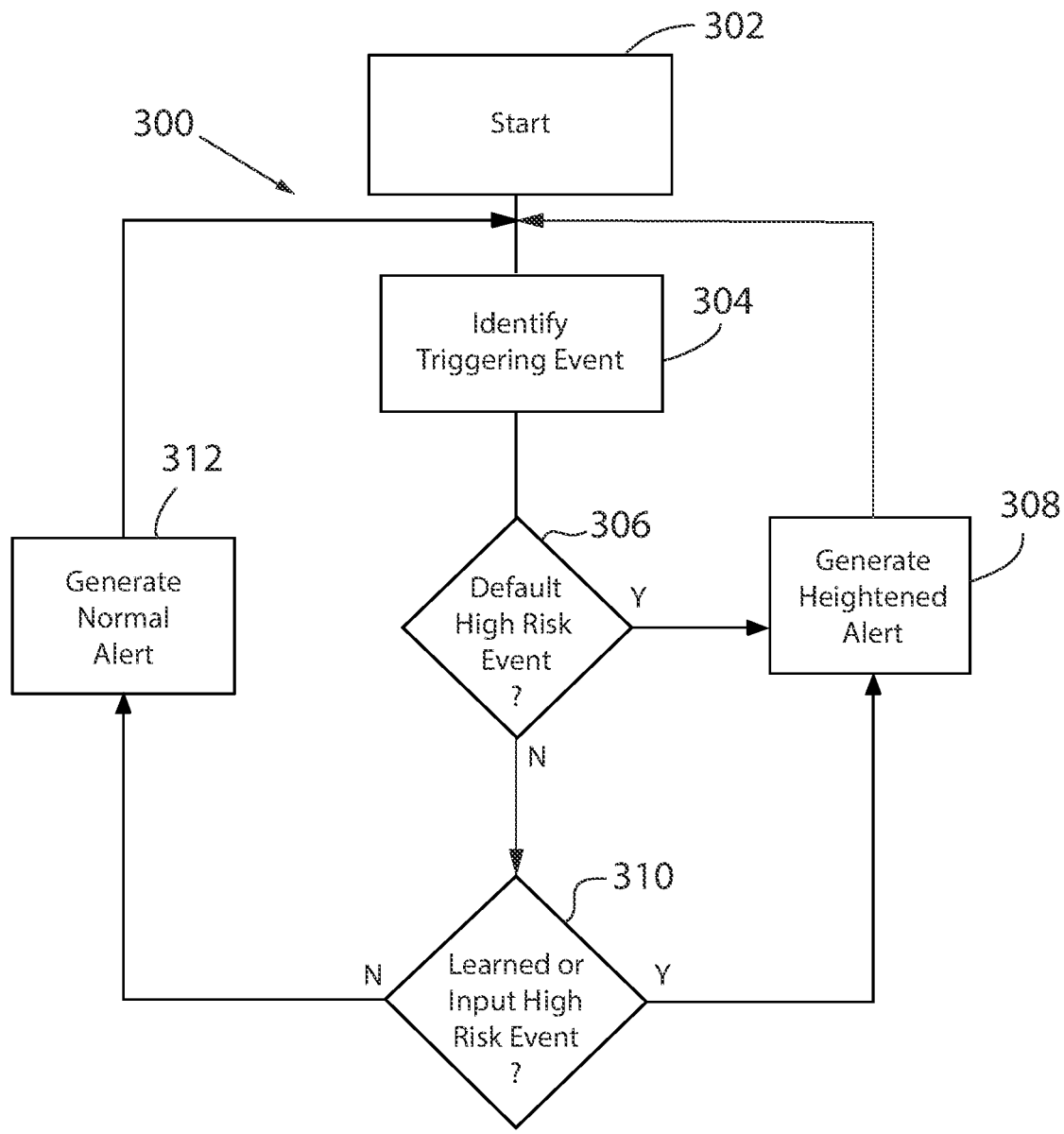
FIG. 6 is a flowchart illustrating operational steps for evaluating detected events and for selecting alert levels based on the evaluation.

Referring now to FIG. 6, and with background reference to FIGS. 1-5, detection of events, evaluation of those events, and alert transmission are shown schematically in the flowchart as process 300, which is implemented by system 10 in cooperation with user device 16 and server 58. Process 300 proceeds from START at block 302 to block 304, where a monitoring device 12 detects a triggering event. At decision block 306, risk evaluation module 120 determines whether the triggering event is a default high-interest event or a predesignated high-interest event. As mentioned above, examples of high-interest events may by the triggering of a specific sensor such as a smoke or CO detector or the detection of a specific event by a detector capable of detecting both normal and high interest events, such as the detection of breaking glass, a gunshot, using data from the imaging device's microphone. Default high-interest events may also be detected using image data 112 obtained from 21. That data is analyzed by image evaluation module 116 and transmitted to the risk evaluation module 120. Risk evaluation module 120 then determines that the analyzed data corresponds to default high-interest events, such as fire or the like. As represented at block 308, upon the risk evaluation module's determination that the event is a default or predesignated high-interest event, the process 300 commands the transmission and display of a heightened alert. This alert may include a highly conspicuous audible and/or visual alert or notification to a user device 16. The alert may also be sent to appropriate emergency authorities or other parties, such as trusted third parties in the form of relatives, neighbors, etc. The process 300 then returns to block 304. If the process 300 determines in block 306 that the triggering event is not in a default or predesignated high-interest category, then the process 300 proceeds to block 310 to determine whether the triggering event is a learned or user-input high interest event as described above in connection with blocks 204-220 of FIG. 5. For example, an individual's image my correspond to the database of stored high-interest individuals' images as entered in blocks 210 and 222. The event, or a combination of events such as the detection of a vehicle at a particular time of day, may also be compared to the database of patterns of events or combinations of events as created and stored in blocks 208 and 222. If, at decision block 310, the event is determined to be a high-interest or high-risk event, the process 300 proceeds to block 308 and generates a heightened alert. If the event is determined to be allow interest event, then a lower or standard alert is generated and sent at block 312, and the process returns to block 304.

Accordingly, the invention provides a new and useful system that may further automatically execute tasks in order to categorize triggering events and send different types of alerts based on the categories of the triggering events. Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc. that perform one or more tasks or implement particular data types, algorithms, and/or methods.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. An electronic monitoring system for monitoring an environment, the electronic monitoring system comprising:
   at least one monitoring device configured to monitor a monitored zone within the environment for detecting a triggering event;
   a controller defining a default mode and a temporary mode and configured to:
      receive data from the at least one monitoring device, the data corresponding to the triggering event;
      evaluate the triggering event according to a first set of evaluation rules when in the default mode and a second set of evaluation rules in the temporary mode;
      as a result the evaluation, determining in which of at least two interest categories the triggering event belongs, the determination being based on a comparison of the data to a baseline event characteristic;
      generate an alert to display on a user device based on the determined interest category of the triggering event, wherein different types of alerts are displayed on the user device with different levels of noticeability depending on the determined interest category.

2. The electronic monitoring system of claim 1, wherein:
   the controller is configured to categorize the triggering event as a low-interest event or a high-interest event, and wherein the controller is configured to cause the transmission of a first alert signal to the user device to display a first alert on the user device with a first level of noticeability if the triggering event is a low-interest event and the transmission of a second, heightened alert signal to the user device to display a second alert on the user device with a second, greater, level of noticeability if the triggering event is high-interest event.

3. The electronic monitoring system of claim 2, wherein the controller is configured to evaluate the triggering event as a function of patterns of information relating to the triggering event and wherein a first pattern of information corresponds to the default mode of the at least one monitoring device and a second pattern of information corresponds to the temporary mode of the at least one monitoring device.

4. The electronic monitoring system of claim 3, wherein the controller is configured to evaluate the triggering event as a function of identified patterns of information relating to multiple triggering events that were previously detected by the system.

5. The electronic monitoring system of claim 3, wherein the evaluation of the interest category of the triggering event includes a comparison of the triggering event to a corresponding characteristic of a baseline event.

6. The electronic monitoring system of claim 3, further comprising a data storage device that stores information relating to predefined interest parameters, and wherein controller is configured to evaluate the triggering event as a function of the predefined interest parameters.

7. The electronic monitoring system of claim 3, wherein the controller is configured to evaluate a learning set of data stored on a data storage device to identify patterns of information stored on the data storage device and used by the controller to evaluate the triggering event.

8. The electronic monitoring system of claim 1, wherein the low-interest event and the high-interest events are a low-risk event and a high-risk events, respectively.

9. The electronic monitoring system of claim 8, wherein the high risk event includes at least one of smoke, carbon dioxide, a gunshot, breaking glass, the presence of a specific individual of concern, and the presence of a person or vehicle at a specific time.

10. The electronic monitoring system of claim 1, wherein
    the system comprises a base station in wireless communication with the monitoring device via a WLAN and with an external server and the user device via a WAN, wherein
    the monitoring device comprises an imaging device that includes a camera and that is in wireless communication with the base station via the WLAN, and wherein
    the controller is located at least in part in at least one of the imaging device, the base station, the external server, and the user device.

11. An electronic monitoring system for detecting abnormal events while monitoring an environment, the electronic monitoring system comprising:
    at least one imaging device configured to obtain images of a monitored zone within a monitored environment;
    a base station in wireless communication with the imaging device and with an external server which is in wireless communication with a user device; and
    a controller contained at least in part in at least one of the base station and the imaging device, the controller defining a default mode and a temporary mode and including
       an image evaluation module that is configured to receive image data from the at least one imaging device corresponding to a triggering event and to evaluate the image data according to a first set of rules when in the default mode and a second set of rules when in the temporary mode;
       an interest evaluation module that is configured to receive the evaluated image data and to categorize the triggering event as either a low-interest event or a high-interest event based on a comparison of the image to a definable baseline event characteristic, wherein the controller is configured to send a first alert to the user device for display with a first level of noticeability if the triggering event is a low-interest event and a second, heightened alert to the user device for display with a second, greater, level of noticeability if the triggering event is a high-interest event.

12. The electronic monitoring system of claim 11, wherein the controller further comprises a pattern evaluation module that:
    evaluates information that relates to previous images obtained by the at least one imaging device;
    identifies a pattern of information based on the evaluation; and
    establishes at least one baseline event characteristic for use by the evaluation mode in determining whether the triggering event is a low-interest event or a high-interest event.

13. The electronic monitoring system of claim 12, wherein the interest evaluation module is configured to evaluate a learning set of data that is stored on a data storage device and that corresponds to the information that relates to the previous images.

14. The electronic monitoring system of claim 1, wherein the interest evaluation module is a risk evaluation module, and wherein the low-interest event and the high-interest events are a low-risk event and a high-risk events, respectively.

15. A method for operating an electronic monitoring system, the method comprising:
 detecting a triggering event with a monitoring device;
 determining, using a controller, whether the triggering event is a low-interest event or a high-interest event based on a comparison of the triggering event to a definable baseline event characteristic according to a first set of rules when in a default mode and a second set of rules when in a temporary mode; and
 using the controller, sending a first alert to the user device for display with a first level of noticeability if the triggering event is a low-interest event and a second, heightened alert to the user device for display with a second, greater, level of noticeability if the triggering event is a high-interest event.

16. The method of claim 15, further comprising, using the controller,
 defining the baseline event characteristic for the default mode by defining a pattern of information relating to potential triggering events during a first time period,
 defining the baseline event characteristic for the temporary mode by defining a pattern of information relating to potential triggering events during a second time period; and
 for each of the default and temporary modes,
  evaluating the data related to the triggering event as a function of the pattern of information; and
  categorizing the triggering event as belonging to one of a plurality of interest categories based on the evaluation of the triggering event as a function of the pattern of information, the interest categories including at least the low-interest event and the high-interest event in respective categories.

17. The method of claim 16, further comprising, using the controller, defining the pattern of information by evaluating a learning set of data stored on a data storage device and that corresponds to previously detected triggering events at the environment.

18. The method of claim 15, wherein the low-interest alert comprises at least one of a tone and a push notification, and wherein the high-interest alert comprises at least one of a series of tones, and alarm, and a visual warning.

* * * * *